No. 12,045. Reissued Oct. 21, 1902.
M. PETERS.
MEAT POUNDER.
Application filed Oct. 17, 1901.)
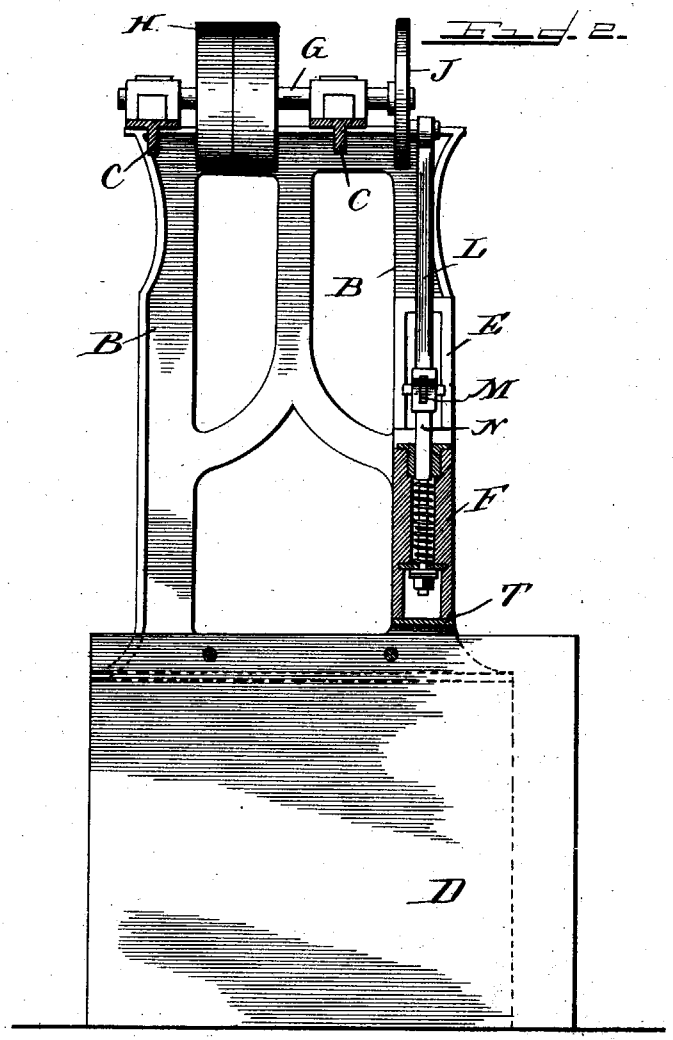
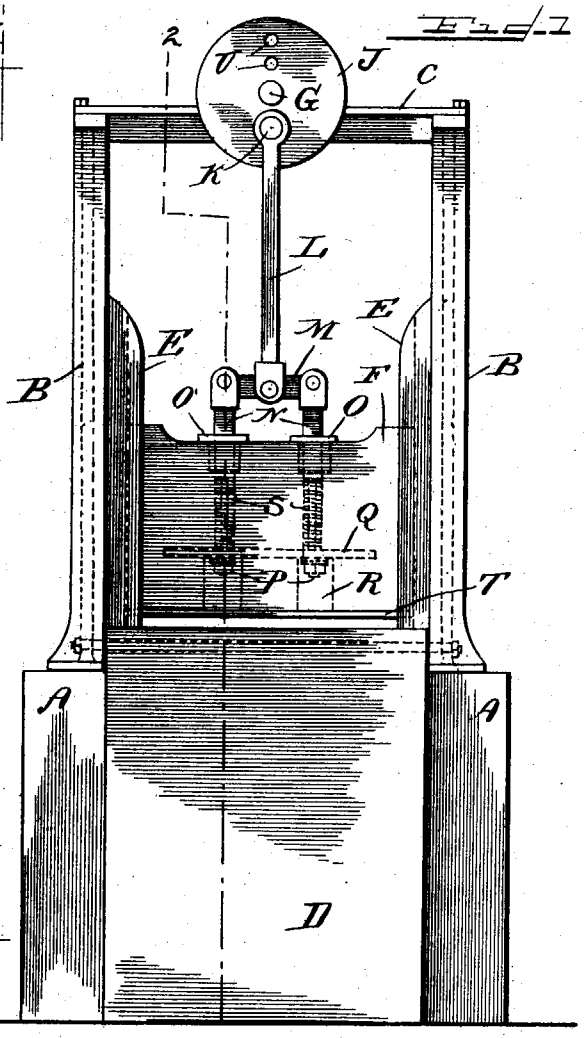
Witnesses
Chas. A. Seem
B. C. Semple
Inventor
Matthew Peters
By Brown & Darby
Attys
THE NORRIS PETERS CO., PHOTO-LITHO., WASHINGTON, D. C.

UNITED STATES PATENT OFFICE.

MATTHEW PETERS, OF CHICAGO, ILLINOIS, ASSIGNOR TO WILLIAM R. PERRIN & CO., OF CHICAGO, ILLINOIS.

MEAT-POUNDER.

SPECIFICATION forming part of Reissued Letters Patent No. 12,045, dated October 21, 1902.

Original No. 668,740, dated February 26, 1901. Application for reissue filed October 17, 1901. Serial No. 78,972.

*To all whom it may concern:*

Be it known that I, MATTHEW PETERS, a citizen of the United States, residing at Chicago, in the county of Cook and State of Illinois, have invented a new and useful Meat-Pounder, of which the following is a specification.

This invention relates to meat-pounders.

The object of the invention is to provide a machine of simple and efficient construction and arrangement for pounding or flattening the sides or cuts from the sides of hogs.

The invention consists, substantially, in the construction, combination, location, and relative arrangement of parts, all as will be more fully hereinafter set forth, as shown in the accompanying drawings, and finally specifically pointed out in the appended claims.

Referring to the accompanying drawings, and to the various views and reference-signs appearing thereon, Figure 1 is a view in front elevation of a machine embodying the principles of the invention. Fig. 2 is a vertical sectional view of the same on the line 2 2, Fig. 1.

In the preparation of meats for the market, and particularly sides of bacon, it is desirable that the sides or cuts from the sides be flattened out smooth in order that the sides or cuts may present when trimmed a nice neat appearance and in order that the retailer may more easily and readily slice the side or cut for the retail trade. Sides or cuts from the sides of bacon thus pounded or flattened out also command a better price in the market by reason of the nice appearance thereof and the facility with which such sides or cuts may be sliced. Heretofore this pounding or flattening of sides or cuts from the sides of bacon has been performed by hand. Such practice, however, is slow, and hence involves additional expense for the time and labor of workmen to perform such work. It is the purpose of the present invention to provide a machine for doing this work whereby the same quality of work may be turned out rapidly and expeditiously, thus saving the cost of the labor involved in the custom heretofore.

The accompanying drawings illustrate a machine which is simple and inexpensive in construction and which efficiently performs the duties required, and wherein reference-sign A designates a suitable base or support upon which is mounted and suitably secured the upright standards B B, suitably connected together at the top by T-beams C or otherwise. These several parts constituting the framework of the machine may be suitably bolted or otherwise secured together in order to secure rigidity and strength. Between the side walls or portions of the base A is arranged a suitable block, preferably, though not necessarily, a solid block D, upon the top surface of which the sides or cuts of bacon are to be pounded or flattened. On the opposed faces of the front uprights or standards B B are formed suitable guides E, and mounted to slide in these guides is a pounding-block F. Suitably journaled in bearings formed on or carried by the cross-connecting T-beams C is a shaft G, carrying suitable fast and loose pulleys H, by which rotation may be imparted to said shaft from any conveniently-located source of power. Reciprocation may be imparted to pounding-block F from shaft G in any suitable or convenient manner. For instance and in the form shown a disk or plate J is mounted on the end of shaft G and carries a wrist-pin K, to which is pivotally connected one end of a pitman L. The other end of said pitman is pivotally connected to a cross-head M intermediate the ends thereof. To each end of said cross-head M is pivotally connected a rod N. The pounding-block F is provided with passages or openings, in which rods N are received. In order to secure smoothness in the operation of the machine and in order to prevent jar, the rods N are enlarged and are preferably cylindrical at their upper ends, such enlarged ends being arranged to be received and to play in suitable stuffing-boxes O, mounted in the pounding-block. On the reduced ends of rods N are mounted suitable nuts P, these nuts being arranged to operate against a plate Q, suitably arranged in the pounding-block, the pounding-block being suitably countersunk, as at R, to receive the nuts P for the same to play up and down therein. Springs S are mounted on the reduced ends of rods N, said springs being arranged to bear at their upper ends against the shoulder formed on said rods by reducing the same, and at their lower ends said springs bear upon plate Q. A covering or plate T on the lower surface of the pounding-block not only serves to close the passages through the pounding-block in which the rods N operate, but also forms the pounding-surface.

If desired and in order to vary the length of stroke of pitman L to accommodate the machine to different thicknesses of the sides or cuts of bacon, the end plate or disk J may be provided with a series of holes U, in any one of which the wrist-pin K may be received, said holes being arranged at different distances from the axis of said disk or plate.

The operation of the machine is as follows: A side or cut from the side of a piece of bacon is placed upon the block D. Rotation is then imparted to shaft G, whereupon vertical reciprocation of the pounder F is effected. On the upward movement of pitman L the nuts P engage or abut against the under side of plate Q, thereby causing the block F to move upwardly in its guides E. On the downward movement of pitman L the rods N are moved longitudinally and yieldingly through stuffing-boxes O against the action of springs S, thus imparting to the pounding-block a resilient or yielding pounding movement. By reason of imparting the pounding movement through the springs S not only is shock and jar of the machine avoided, but danger of injuring or defacing the meat being operated upon is avoided.

One workman may supply the meat to be pounded or flattened to the machine, or, if desired, one workman may place the meat in the machine from the front side and another remove it from the rear side.

I have found in practical operation that a machine constructed in accordance with my invention will pound or flatten a side or cut of bacon as evenly, nicely, and smoothly as can possibly be done by hand and that more work can be accomplished by one machine in an hour than by two men working all day by hand.

Many changes in and variations from the specific construction and details shown and described may readily suggest themselves to persons skilled in the art and still fall within the spirit and scope of my invention. I do not desire, therefore, to be limited or restricted to the exact construction and arrangement shown and described; but, Having now set forth the object and nature of my invention and a form of apparatus embodying the same, what I claim as new and useful and of my own invention, and desire to secure by Letters Patent of the United States, is—

1. In an apparatus for flattening the sides of bacon, a pounding-block having an extended flat pounding-surface, a rod mounted therein for movement relative thereto, a spring arranged to resist the relative movement of said block and rod, a pitman connected to said rod, and means for reciprocating said pitman whereby the pounding blow of the pounding-block is delivered through a yielding resistance, in combination with a stationary block having an extended flat surface arranged to coöperate with the pounding-surface of said pounding-block, as and for the purpose set forth.

2. In an apparatus for smoothing and flattening cuts of meat, a framework, a shaft journaled therein, a pitman connected to said shaft, a pounding-block yieldingly connected to said pitman and provided with an extended plain flat pounding-surface, and guides formed in said framework in which said pounding-block operates, in combination with a stationary block having an extended plain flat surface arranged to coöperate with the pounding-surface of said pounding-block, as and for the purpose set forth.

3. In an apparatus for flattening and smoothing cuts of meat, a framework, guides formed therein, a pounding-block mounted to reciprocate in said guides, and provided with an extended plain flat pounding-surface, passages formed through said pounding-block, rods arranged in said passages and having shoulders, springs interposed between said pounding-block and shoulders, a cross-head connected at its ends to said rods, a pitman connected to said cross-head intermediate the ends thereof, and means for reciprocating said pitman, in combination with a stationary block having an extended plain flat surface coöperating with the pounding-surface of said pounding-block, as and for the purpose set forth.

4. In an apparatus for flattening the sides of bacon, a framework, guides formed in said framework, a pounding-block mounted to reciprocate in said guides, and provided with an extended flat pounding-surface, a rod arranged to pass through said block, a nut carried by one end of said rod, said nut arranged to abut against said block when said rod is moved to raise said block, a spring interposed between said block and said rod, to yieldingly oppose the relative movement of said rod and block when said rod is moved to effect the pounding action, a pitman connected to said rod, and means for reciprocating said pitman, in combination with a stationary block provided with an extended flat surface arranged to coöperate with the pounding-surface of said pounding-block, as and for the purpose set forth.

In witness whereof I have hereunto set my hand, this 28th day of March, 1898, in the presence of the subscribing witnesses.

MATTHEW PETERS.

Witnesses:
B. E. JANORSKY,
B. F. NELL.